United States Patent Office 3,615,103
Patented Oct. 26, 1971

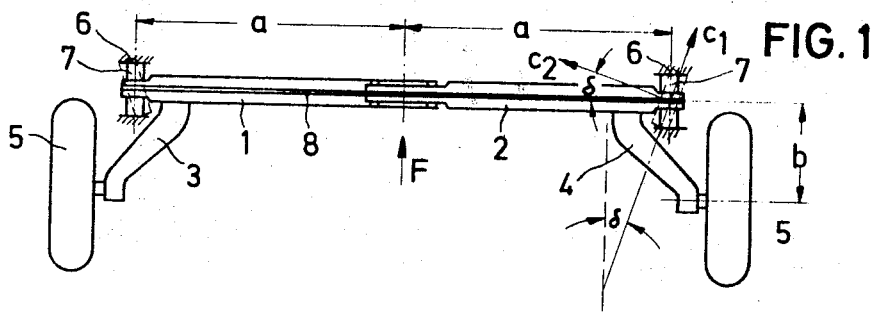
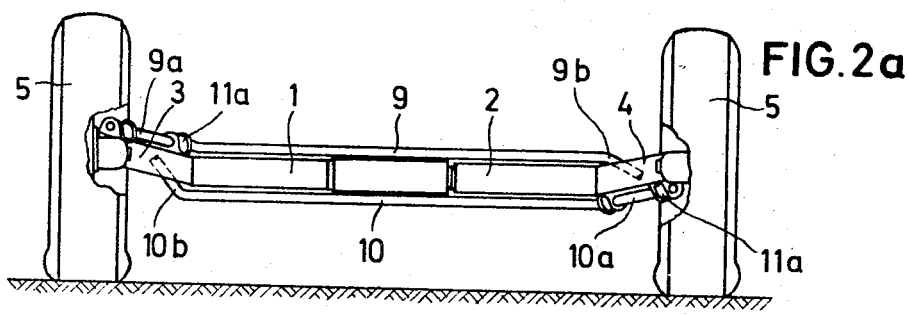
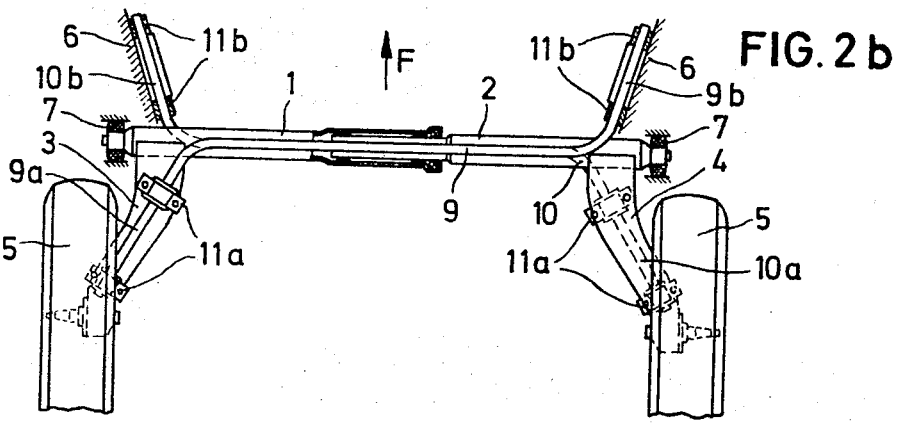
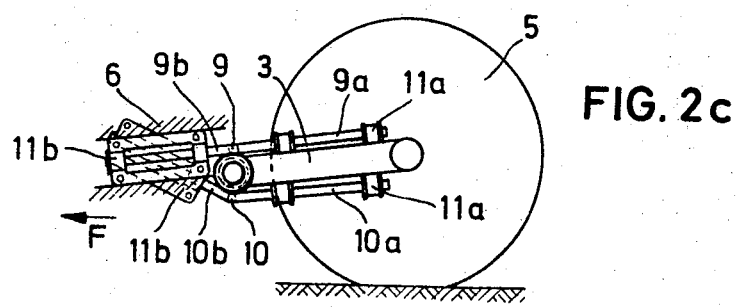

3,615,103
MOTOR VEHICLE AXLE WITH WHEELS
GUIDED BY MEANS OF PULL RODS
Ekkehard Döhring, Wolfsburg, and Fritz Schael, Ehmen,
Germany, assignors to Volkswagenwerk AKG., Wolfsburg, Germany
Filed Nov. 18, 1969, Ser. No. 877,619
Claims priority, application Germany, Nov. 19, 1968,
P 18 09 698.5
Int. Cl. B60g 11/18
U.S. Cl. 280—124
8 Claims

ABSTRACT OF THE DISCLOSURE

Motor vehicle axle having supporting journals for pull rods mounted one inside the other and elastic bearings on the vehicle for supporting the outside ends of the journals.

---

The invention relates to a motor vehicle axle with wheels guided by means of longitudinally guided pull rods.

In the case of a pull rod or transverse guide rod axle, the guide rods must be mounted relatively rigidly in the interest of an exact as possible a guidance of the wheel to achieve lateral stability. This is opposed by the requirement for the least possible transmission of noise which requires an elastic mounting. For that reason, in the case of a known solution, for example, described in the journal entitled "Automobile Revue," No. 28 of June 21, 1962, p. 25, an auxiliary bearer or an auxiliary frame is used on which the guide rods are mounted relatively rigidly, whereas the auxiliary frame is suspended on a broad base relatively elastically.

In the case of another solution, compare for example the journal, "Automobile Revue" of Jan. 21, 1965, pp. 17 and 21, the supporting journals of the pull rod are executed very long and arranged one behind the other putting up with a different wheel base on the left and right in order to fulfill the opposing demands for wheel guidance and insulation of noise through a broad base.

The invention starts out from the object of simplifying the axle by saving of an auxiliary frame and avoiding parallel supporting journals.

It is an object of the invention, to provide the supporting journals of the pull rods to be mounted swivelably into one another using a rigid mounting and approximately in the middle of the car, and the outside ends of the supporting journals are arranged on a broad base in elastic mountings on the vehicle.

A further object of the invention resides in the longitudinal axes of the elastic bearings being arranged slantingly vis-a-vis rotational axes of the supporting journals. The elastic bearings are given a slanting position which is to be calculated in the longitudinal and transverse direction of the elastic bearings using varying spring constants where the position of the elastic center can be selected in such a manner that a shifting of the wheel which either increases the lateral guidance, will be achieved.

It will be effective within or also without the supporting journals, to arrange a stabilizer which at the same time will hold together the pull rods against any axial shifting.

Two torsion rods bent in a Z-shape can be provided as a suspension, one of which has been arranged above and the other below the supporting journals, and whose angular ends are connected each time with elastic bearings with one of the pull rods on the one hand and the body on the other hand.

The advantage of the method of construction according to the invention in summary, lies in the fact, that it is simple and that it is suitable for mass production, that one can achieve with it by reconcilably influencing the intrinsic steering effect on an optimum of road holding properties and that on the other hand, by the elastic mounting of the axle on the body of the vehicle, noises are dampened with regard to the body.

Further objects will be apparent from the following description when considered in connection with the accompanying drawing in which;

FIG. 1 shows a top view of a diagrammatically drawn motor vehicle axle;

FIGS. 2a, 2b, and 2c are an end view, a top view and side view respectively of the axes with main springs included.

The supporting journal 1 of the pull rod 3, viewed in the direction of travel, arrow F, is mounted approximately in the middle of the vehicle in the supporting journal 2 of the right-hand pull rod 4, and 5 are the wheels of the vehicle. The mounting of the supporting journals 1 and 2 has been made as rigid as possible but it would still permit a good swivel motion of the supporting journals 1 and 2 in relation to one another.

The outer ends of the supporting journals 1 and 2 are seated with a considerable distance 2a on a broad basis, in bearings 7 arranged on the frame or body 6 of the vehicle which bearings 7 have been arranged somewhat slantingly at an angle δ, FIG. 1, in relation to one another.

By the use of various elastic constants in the longitudinal direction c1, FIG. 1, and in the transverse direction c2 of the bearing 7 on the vehicle, a tilting position of these bearings 7 can take place in which the lateral guiding forces of the wheels 5 will influence either in or at least close to the elastic center of the bearings, therefore causing predominantly a parallel shifting of the planes of the wheels, or the wheel axes, by a lateral force. As a result thereof, an inherent steering effect of the axle can be prevented or can be brought about consciously despite the elastic mounting. The angle δ of the tilting position of the bearing 7 depends on the relationship L of the elastic constants $$L = \frac{c1}{c2}$$

and the constructional dimensions b, the length of the pullrods 3 and 4 or the distance of the elastic centering, and a half of the distance of the bearings 7, ab according to the formula:

$$\frac{b}{a} = \frac{tg(L-1)}{1 + L t_g^2 \delta}$$

By the selection of the position of the elastic center one can achieve an elastic shifting, inherent steering effect, of the wheels 5 increasing or decreasing the lateral guidance, and thereby achieve the best possible movement of the vehicle during travel.

A stabilizer 8 is located inside the supporting journals 1 and 2 which by the connection of the pull rods 3 and 4, one with the other will at the same time facilitate the preliminary assembly and the installation of the axles in the vehicle. The stabilizer 8 naturally may be also arranged outside the supporting journals 1 and 2.

Torsion rods 9 and 10 which have been bent into Z-shape, have been provided as springs, one 9, of which has been attached with its angular leg or part 9a, on top on the left-hand pull rod 2, then runs above the supporting journals 1 and 2 and is connected with its other leg 9b with the body 6 of the vehicle whereas the other torsion rod 10 located below the supporting journals 1 and 2 has been attached correspondingly with its legs 10a and 10b on the right-hand pull rod below and on the body 6, whereby each time two elastic bearings 11a or 11b have been provided as connecting elements at all four places of attachment of the legs 9a and 10a or 9b and 10b.

We claim:

1. An axle for a motor vehicle comprising elongated supporting journals serving to guide the wheels of the motor vehicle, said journals extending transversely with respect to the longitudinal axis of said motor vehicle and being fitted one within the other at their inner ends so that the longitudinal axis of each said journal is coaxial, said inner ends being so fitted as to permit rotation of each said journal about each of their longitudinal axes but to resist bending thereat, and the outer ends of each said journal being mounted on said motor vehicle in elastic bearings which also permit rotation of each journal.

2. Motor vehicle axle according to claim 1, in which each of said elastic bearings has a longitudinal axis arranged capable to tilt at an angle in relation to the rotational axes of the supporting journals.

3. Motor vehicle axle according to claim 1, in which each of said elastic bearings has a longitudinal axis arranged capable to tilt at an angle in relation to the rotational axes of the supporting journals, the tilting position relative to the bearings being calculated on the basis of varying elasticity constants in a longitudinal direction and transverse direction of the elastic bearings and the lateral guiding forces of the wheels engaging approximately in the elastic center of the bearings.

4. Motor vehicle axle according to claim 1, in which a position of the elastic center of the axle is such that a shifting of the wheels increases the lateral guidance.

5. Motor vehicle axle according to claim 1, in which a position of the elastic center of the axle is such that a shifting of the wheels decreases the lateral guidance.

6. Motor vehicle axle according to claim 1, in which a stabilizer is provided in the axle to hold pull rods together against axial shifting and arranged inside the supporting journals.

7. Motor vehicle axle according to claim 1, in which two torsion rods are provided each in the shape of a Z.

8. Motor vehicle axle according to claim 1, in which two torsion rods are provided each in the shape of a Z, one of which being arranged above the other below the supporting journals and the angular ends being connected by elastic bearings with one of the pull rods on the one hand and the vehicle on the other hand.

References Cited

UNITED STATES PATENTS

| | | | |
|---|---|---|---|
| 2,741,493 | 4/1956 | Matthias | 280—124 |
| 2,755,875 | 7/1956 | Muller | 280—124 X |
| 3,116,071 | 12/1963 | Wilfert et al. | 280—124 |

MILTON BUCHLER, Primary Examiner

C. A. RUTLEDGE, Assistant Examiner